United States Patent [19]

De Berraly et al.

[11] Patent Number: 4,786,662

[45] Date of Patent: Nov. 22, 1988

[54] STORAGE-STABILIZED COMPOSITIONS BASED ON VINYLIDENE FLUORIDE POLYMERS COMPRISING A METAL MOLYBDATE

[75] Inventors: Jean-Marie De Berraly, Waterloo; Anthony Simoens, Vedrin, both of Belgium

[73] Assignee: Solvay & Cie, Brussels, Belgium

[21] Appl. No.: 128,106

[22] Filed: Dec. 3, 1987

[30] Foreign Application Priority Data

Dec. 15, 1986 [FR] France .................. 86 17622

[51] Int. Cl.$^4$ .............................................. C08K 3/26
[52] U.S. Cl. ................................. 524/406; 524/424; 524/425; 524/545
[58] Field of Search ............... 524/406, 425, 424, 545

[56] References Cited

U.S. PATENT DOCUMENTS

| 2,183,556 | 12/1939 | Fawcett | 525/356 |
| 2,364,410 | 12/1944 | Whittaker | 524/567 |
| 3,582,518 | 6/1971 | Lyons | 524/406 |
| 4,532,289 | 7/1985 | Mosser et al. | 524/406 |

FOREIGN PATENT DOCUMENTS

| 0107220 | 5/1984 | European Pat. Off. |
| 2743576 | 4/1979 | Fed. Rep. of Germany |
| 58-37040 | 3/1983 | Japan |
| 2072196 | 9/1981 | United Kingdom |

*Primary Examiner*—Veronica P. Hoke
*Attorney, Agent, or Firm*—Stevens, Davis, Miller and Mosher

[57] ABSTRACT

Storage-stabilized compositions based on vinylidene fluoride polymers containing a metal molybdate and, as stabilizer, an effective quantity of alkali metal or alkaline-earth metal carbonate.

The compositions are most particularly suitable for the manufacture of shaped objects employed in building and in aeronautics.

8 Claims, No Drawings

STORAGE-STABILIZED COMPOSITIONS BASED ON VINYLIDENE FLUORIDE POLYMERS COMPRISING A METAL MOLYBDATE

The present invention relates to storage-stabilized compositions based on vinylidene fluoride polymers containing a metal molybdate.

Vinylidene fluoride polymers are relatively difficult to ignite and are self-extinguishing. It has already been proposed to incorporate therein flame-retardant additives in order to improve further their resistance to ignition. Nevertheless, flame retardants have been generally found incapable of completely preventing, at elevated temperature, the combustion of shaped objects made of vinylidene fluoride polymers. Furthermore, it is now known that, contrary to a widely held view, the combustion of shaped objects made of vinylidine fluoride polymers gives rise to the emission of smoke in a sufficient quantity to constitute a disadvantage as severe as the flames themselves insofar as it makes the intervention of assistance more difficult.

In patent FR-A-82 17 123 (SOLVAY & Cie), there is a description of the use of molybdenum derivatives such as metal molybdates, in order to reduce effectively the quantity of smoke emitted during the combustion of vinylidine fluoride polymers.

It has now been found that the compositions based on vinylidene fluoride polymers which contain metal molybdates have the disadvantage of blueing when stored in a moist atmosphere. Although this blueing does not affect the smoke-destroying efficiency of metal molybdates, the appearance of a bluish colour severely restricts the potential uses of the compositions in question, particularly in the field of the manufacture of colourless or light-coloured objects, such as cable sheeting.

The present invention, as characterized in the claims, is intended to overcome the abovementioned disadvantage. For this purpose, it provides compositions based on vinylidene fluoride polymers containing a metal molybdate whose colour is stable when stored in a moist atmosphere.

According to the invention, these compositions contain, as stabilizer, an effective quantity of alkali metal or alkaline-earth metal carbonate. All alkali metal or alkaline-earth metal carbonates and their mixtures are suitable for the production of compositions according to the invention. Nevertheless, preference is given to alkaline-earth metal carbonates such as, for example, calcium, magnesium or barium carbonates. An alkaline-earth metal carbonate which is very particularly preferred is calcium carbonate.

The quantity of carbonate present in the compositions according to the invention may vary within quite wide limits. The carbonate is usually employed in a proportion of at least 1 part by weight and not more than 100 parts by weight per 100 parts of molybdate. It is preferably employed in a proportion of 5 to 30 parts by weight in all per 100 parts of metal molybdate.

All metal molybdates and their mixtures can be employed in the compositions according to the invention. By way of examples of such molybdates there may be mentioned sodium, bismuth, calcium, zinc and aluminium molybdates. Particularly preferred metal molybdates are calcium, zinc and aluminium molybdates.

The quantity of molybdate present in the compositions according to the invention may vary within wide limits, particularly as a function of the desired result and of the nature of the molybdate employed. The molybdate is usually employed in a proportion of 0.05 to 2 parts by weight, expressed as molybdenum metal, per 100 parts of vinylidene fluoride polymer and, preferably, from 0.10 to 0.50 part.

Preferred compositions according to the invention thus contain from 5 to 30 parts by weight of alkaline-earth metal carbonate per 100 parts of metal molybdate and from 0.10 to 0.50 part by weight of metal molybdate, expressed as molybdenum metal, per 100 parts of vinylidene fluoride polymer.

Vinylidene fluoride polymers are understood to denote all the polymers containing at least 85 mol %, and preferably at least 90 mol % of monomer units derived from vinylidene fluoride. The vinylidene fluoride polymers which are suitable for producing the compositions according to the invention thus comprise both vinylidene fluoride homopolymers and its copolymers containing monomer units derived from one or more comonomers. Particularly advantageous results are obtained with vinylidene fluoride polymers containing at least 90 mol % of monomer units derived from vinylidene fluoride, any remainder consisting preferably of monomer units derived from other fluoroolefins, such as vinyl fluoride, trifluoroethylene, chlorotrifluoroethylene, tetrafluoroethylene and hexafluoropropylene.

In addition to the molybdate and the carbonate, the compositions according to the invention may contain all the usual additives for vinylidene fluoride polymers, such as lubricants, flame retardants, polymeric additives and the like. In general, the compositions according to the invention contain at least 65% by weight of one or more vinylidene fluoride polymers and, in most cases, at least 80% by weight of such polymers.

In order to prepare the compositions according to the invention, the carbonate and the molybdate may be employed in any form whatever, as powder or as aqueous dispersion, for example. However, for reasons of convenience it is preferred to employ them in powder form. In this case it is advantage to employ powders which have a mean particle size below approximately 200 $\mu$m. Preferably, the latter is below 100 $\mu$m and more particularly below 50 $\mu$m.

The preparation of the compositions according to the invention does not pose any particular problem, it being possible to use the usual methods of preparing these compositions. Thus, the carbonate and the molybdate may be mixed with the vinylidene fluoride polymer at the polymerization stage either by direct addition to the polymerization mixture, at the end of polymerization or else by addition to the wet cake obtained on dewatering or filtration of the aqueous dispersion originating from polymerisation. A particularly advantageous operating procedure consists in adding the carbonate and the molybdate to the vinylidine fluoride polymer in the form of a powder during the manufacture of a premix, at the same time as the other additives forming part of the composition. It is also possible to introduce the carbonate and the molybdate directly into the apparatus in which the vinylidene fluorid polymer, is melted, such as screw extruders.

The compositions according to the invention can be utilized by means of all the traditional processes for converting thermoplastics. They are very particularly suitable for the manufacture of shaped objects intended to be employed in the fields of application of vinylidene fluoride polymers where as marked reduction in the smoke-generating capacity of the shaped objects is of special advantage, such as in the building industry and in aeronautics (pipes, sheathing, films, paints).

The examples which follow illustrate the invention.

Example 1, for reference, relates to a composition free from carbonate. Examples 2 and 3 relate to compositions according to the invention. Example 4, for reference, relates to a composition containing calcium sulphate.

The formulations evaluated have the following composition, the quantities being expressed on a weight basis:

| Vinylidene fluoride polymer | 100 |
| Polyethylene wax | 0.2 |
| Calcium molybdate | 0.2 |
| Carbonate (or sulphate) | see Table I. |

In all the examples, the vinylidene fluoride polymer is a copolymer of vinylidene fluorfde containing 10% by weight of monomer units derived from a fluoroolefin of registered trademark Solef and of type 11010 produced and marketed by Solvay & Cie.

The calcium molybdate employed is in the form of a powder which has a mean particle size of below 50 μm.

The compositions 1 to 4 were prepared by dry blending of all the ingredients at ambiant temperature in a slow blender. The blends thus obtained were granulated at 190° C. The granules were used for pressing plaques 3 mm in thickness from which specimens of 0.3 cm×5 cm×10 cm were cut. Specimens 1 to 4 were then cut into two equal parts one of which was stored in ambiat air (reference specimen, and the other was immersed for two hours in boiling water. After this period of time, a photometer was used to determine the trichromatic components X, Y and Z of the eight half-specimens by measuring reflectances through amber, green and blue trichromatic filters (illuminant: C, observer 2°). The trichromatic components were then used to calculate, using Hunter's method, the colour difference ΔE between each reference specimen and each corresponding specimen kept for 2 hours in boiling water. Huner's method is described in the work by R. S. Hunter, the Measurement of Appearance, Wiley, 1975. The colour differences ΔE whose values are given in the Table I, attached, make it possible to assess the resistance of the four evaluated compositions to storage in a moist atmosphere.

TABLE 1

| EXAMPLE NO. | STABILIZING ADDITIVE NATURE | QUANTITY PARTS BY WEIGHT | MEAN PARTICLE SIZE, μm | COLOUR DIFFERENCE ΔE |
|---|---|---|---|---|
| 1 | — | — | — | 12 |
| 2 | calcium carbonate | 0.02 | 6.4 | 1.9 |
| 3 | magnesium carbonate | 0.02 | 12.5 | 2.8 |
| 4 | calcium sulphate | 0.02 | 18 | 13 |

We claim:

1. Storage-stabilized compositions based on vinylidene fluoride polymers, containing a metal molybdate, characterized in that they contain molybdate in a proportion of 0.05 to 2 parts by weight, expressed as molybdenum metal, per 100 parts of vinyldine fluoride polymer and they additionally contain, as storage stabilizers alkaline metal or alkaline-earth metal carbonate in a proportion of 1 to 100 parts by weight per 100 of metal molybdate.

2. Stabilized compositions according to claim 1, characterized in that the alkali metal or alkaline-earth metal is an alkaline-earth metal carbonate.

3. Stabilized compositions according to claim 2, characterized in that the alkaline-earth metal carbonate is calcium carbonate.

4. Stabilized compositions according to claim 3, characterized in that the alkali metal or alkaline-earth metal carbonate is employed in a proportion of 5 to 30 parts by weight per 100 parts of metal molybdate.

5. Stabilized compositions according to claim 1, haracterized in that the metal molybdate is chosen from calcium, zinc and aluminium molybdates.

6. Stabilized compositions according to claim 1, characterized in that the metal molybdate is employed in a proportion of 0.10 to 0.50 part by weight, expressed as molybdenum metal, per 100 parts of vinylidene fluoride polymer.

7. Stabilized compositions according to claim 1, characterized in that the vinylidene fluoride polymer is a homopolymer of vinylidene fluoride.

8. Stabilized compositions according to claim 1, characterized in that the vinylidene fluoride polymer is a copolymer of vinylidene fluoride containing at least 90 mol % of vinylidene fluoride.

* * * * *